United States Patent

Oakes

[15] 3,641,306

[45] Feb. 8, 1972

[54] WELDING SUPPLY CIRCUIT INCLUDING CAPACITOR BLEED

[72] Inventor: Malcolm M. Oakes, Torrance, Calif.

[73] Assignee: Hughes Aircraft Company, Culver City, Calif.

[22] Filed: Nov. 3, 1970

[21] Appl. No.: 86,448

Related U.S. Application Data

[62] Division of Ser. No. 789,732, Jan. 8, 1969, Pat. No. 3,586,882.

[52] U.S. Cl. ............................................................. 219/113
[51] Int. Cl. .............................................................. B23k 11/26
[58] Field of Search ..................... 219/113, 108, 114, 69 C, 76

[56] References Cited

UNITED STATES PATENTS 2,515,634   7/1950   Dawson et al....................... 219/113 X

*Primary Examiner*—R. F. Staubly
*Assistant Examiner*—J. G. Smith
*Attorney*—W. H. MacAllister, Jr. and Allen A. Dicke, Jr.

[57] ABSTRACT

Detecting means detects current flow to a capacitor. When capacitor charging current stops, cessation of charging current is detected, and a quick dump bleed path is connected in parallel to the capacitor.

9 Claims, 4 Drawing Figures

PATENTED FEB 8 1972          3,641,306

Malcolm M. Oakes,
INVENTOR.
BY.

ALLEN A. DICKE, Jr.,
AGENT.

3,641,306

WELDING SUPPLY CIRCUIT INCLUDING CAPACITOR BLEED

CROSS-REFERENCE

This application is a division of application Ser. No. 789,732, filed Jan. 8, 1969, entitled CAPACITOR BLEED CIRCUIT, Malcolm M. Oakes, inventor, now U.S. Pat. No. 3,586,882, granted June 22, 1971.

BACKGROUND

This invention is directed to a capacitor bleed circuit and particularly a circuit which detects cessation of capacitor charging to thereupon close a bleed circuit in parallel to the capacitor.

Most power supplies incorporating filter or energy storage capacitors employ bleeder resistors connected in parallel across the capacitor to bleed the charge off of the capacitor when capacitor charging stops. However, such bleeder resistors consume constant power and radiate heat. If they are of high value, they take several minutes to discharge the capacitor. If they are of small value, more power is consumed. Either is objectionable.

SUMMARY

In order to aid in the understanding of this invention it can be stated in essentially summary form that it is directed to a capacitor bleed circuit. The bleed circuit employs a current detector in the capacitor charging line. As long as this detector detects charging current, the bleed circuit is held open. However, upon cessation of charging current flow, the bleed circuit is closed and most of the charge on the capacitor is quickly dissipated. The bleed circuit remains closed until substantially all charge is dissipated from the capacitor or charging of the capacitor is resumed.

Accordingly, it is an object of this invention to provide a capacitor bleed circuit which quickly bleeds a capacitor upon cessation of capacitor charging. It is another object of this invention to provide a capacitor charge current detector which holds a capacitor bleed circuit open until charging current ceases. It is another object of this invention to provide a capacitor bleed circuit wherein the charge on the capacitor supplies the energy for closing of the capacitor bleed circuit when capacitor charging ceases. Other objects and advantages of this invention will become apparent from the study of the following portion of specification, the claims and the attached drawings.

DESCRIPTION

Figure 1:
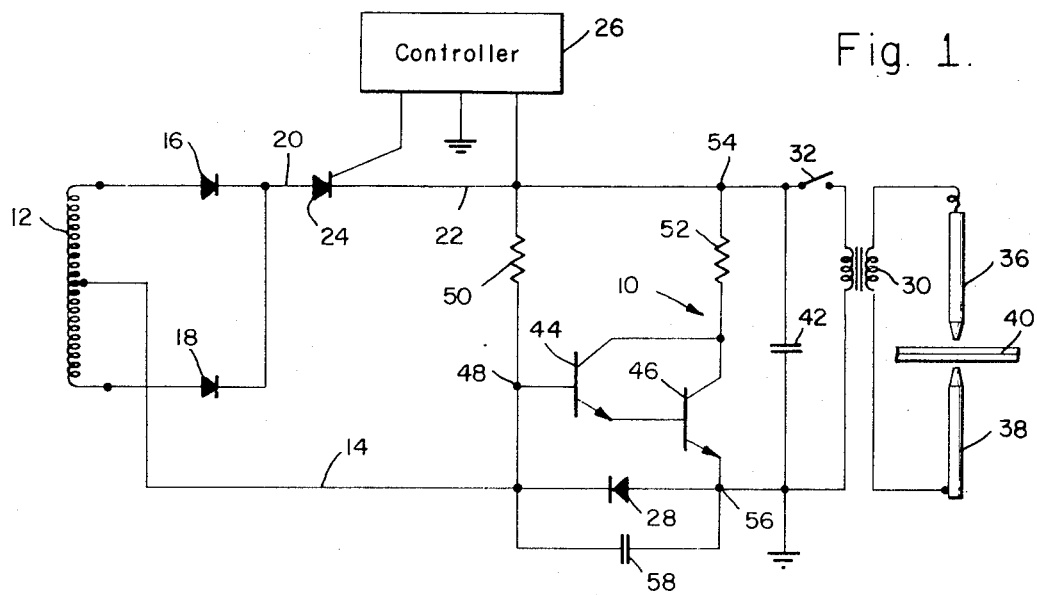
FIG. 1 is a schematic diagram of a welding power supply circuit employing the capacitor bleed circuit of this invention.

The capacitor bleed circuit of this invention is generally indicated at 10 in FIG. 1. It is illustrated in a welding current supply circuit which employs a capacitor to store energy for welding. Power supply transformer secondary 12 is energized from any suitable power supply primary which is connected to the line through suitable switching and fusing. The transformer secondary normally remains energized through a plurality of welding operations.

Figure 3:
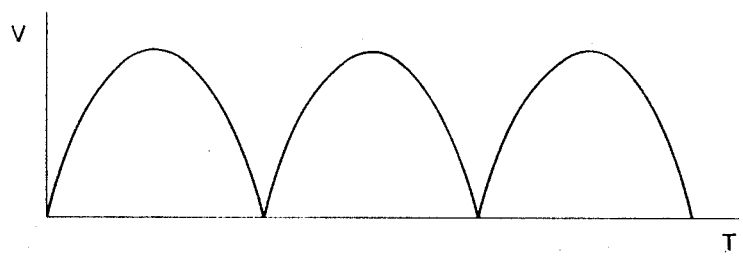
FIG. 3 is a graph showing the uncontrolled rectifier output, a portion of which is employed to charge the capacitor.

Secondary 12 is center-tapped and is connected to negative bus 14. The ends of secondary 12 are connected through rectifier diodes 16 and 18 which have their outputs connected together to unregulated positive bus 20. The waveform of the unregulated power positive bus 20 is illustrated in FIG. 3, and comprises a plurality of positive-going half sine waves. While two rectifying diodes are illustrated, it is clear that a bridge circuit can be employed to provide the current to buses 14 and 20. Full-wave rectification is preferred to half wave, for reasons of charging time.

The transfer of power from unregulated positive bus 20 to regulated positive bus 22 is controlled by SCR 24. SCR 24 has its gate controlled by controller 26 which is controlled by the voltage difference between buses 14 and 22, as well as other signals.

Figure 4:
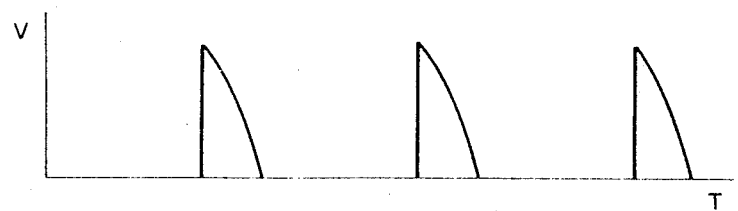
FIG. 4 is an illustrative curve showing the portion of the current employed in charging the capacitor.

These other signals may include charging rate signals, and necessarily include an input indicating the desired charge on the capacitor connected between buses 14 and 22. The controller is connected so that SCR 24 turns on only during the downslope portion of the rectified sine waves. Thus, SCR is only energized as between 90° and 180°, and between 270° and 360° of the sine wave. FIG. 4 illustrates an exemplary point at which SCR 24 is made conductive to illustrate that the peak voltages in regulated positive bus 22 with respect to negative bus 14 are controlled.

Negative bus 14 extends through diode 28 and is connected to one side of the primary of pulse transformer 30. Positive bus 22 extends through weld control switch 32 to the other side of the primary of transformer 30. The secondary of transformer 30 is connected to electrodes 36 and 38, at least one of which is movable so that they can both be engaged with workpieces 40 which are to be welded. Weld storage capacitor 42 is connected across buses 14 and 22 on the side of weld control switch 32 away from transformer 30. It is this capacitor that is charged to supply the welding energy.

Transistors 44 and 46 are connected in the Darlington configuration. The base of transistor 44 is connected at point 48 to negative bus 14 and is connected through resistor 50 to regulated positive bus 22. The collectors of transistors 44 and 46 are connected through resistor 52 to the regulated positive bus 22 at point 54. The emitter of transistor 46 is connected to the negative bus at point 56 between diode 28 and transformer 30. Capacitor 58 is connected in parallel with diode 28.

During normal operation, secondary 12 is energized and controller 26 regulates SCR 24 so that a selected peak voltage difference occurs between regulated bus 22 and negative bus 14. This peak voltage charges capacitor 42 so that its upper side, as seen in FIG. 1, is positive and its lower side is negative. During this charging operation, the voltage drop due to charging current through diode 28 causes capacitor 58 to charge up to the voltage drop of the diode. The normal voltage drop of such diode is between one-half and 1 volt. Thus, the left side of capacitor 58, as seen in FIG. 1, is charged negative with respect to the right side by this voltage drop. For purposes of illustration, the voltage drop will be considered 1 volt. The voltage across capacitor 58 is applied between point 48 and point 56, the base to emitter connections of the Darlington amplifier, thus holding the Darlington amplifier in the cutoff state.

The system remains in that condition until loss of energization at transformer secondary 12, or requirement by controller 26 that the peak voltage difference between buses 14 and 22 be reduced. When such occurs, the charge on capacitor 42, when considering positive current flow, flows through resistor 50 to capacitor 58 to make the left side of capacitor 58 more positive with respect to the right side. Assuming a base to emitter drop of 1 volt in each of transistors 44 and 46 for exemplary purposes, when point 48 rises to 2 volts positive with respect to point 56, the Darlington connection quickly switches on to provide a capacitor dump path for capacitor 42 through resistor 52 and transistor 46.

Resistor 50 and capacitor 58 are chosen so that it takes a reasonable amount of time delay before transistor 46 turns on. In the example given below, with 60 cycle per second energization of transformer 12, after about 3 half cycles of no charging, transistor 46 turns on. Resistor 52 is chosen to permit quick dumping of capacitor 42 consistent with the current limitations of transistor 46. A Darlington connection is chosen for current gain considerations, to quickly turn on transistor 46 to avoid transitional peak power time in transistor 46.

The table of values below gives values of components suitable for employment in a 60-cycle system having a capacitor 42 up to 3,750 microfarads and having a maximum voltage on the capacitor of 400 volts. With these values, and with maximum charge on the capacitor 42, discharge starts about 3 half cycles (about 25 msec.) after cessation of energization of secondary 12 or cutoff of SCR 24, and substantially complete discharge of capacitor 42 is accomplished within about 3.75 seconds.

TABLE

| Number | Item | Value |
| --- | --- | --- |
| 28 | diode | GE-A40F |
| 44 | transistor | 2N 3440 |
| 46 | transistor | DTS-401 |
| 50 | resistor | 43 kΩ |
| 52 | resistor | 200 ohms |
| 58 | capacitor | 100 mf. |
| 60 | transistor | DTS-401 |

Figure 2:
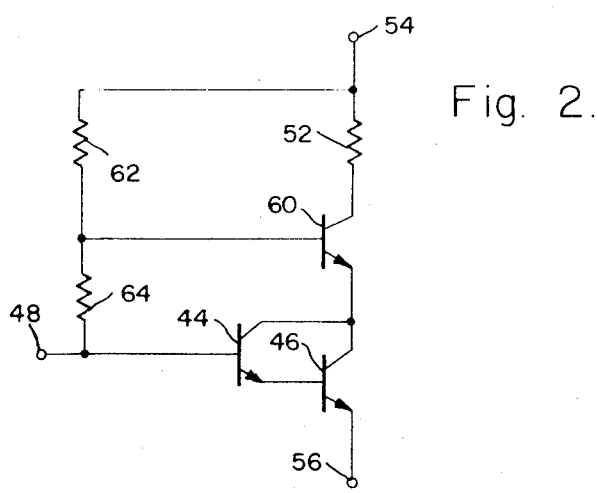
FIG. 2 is a partial schematic showing a portion of an alternative embodiment of the portion of the capacitor bleed circuit.

In cases where the transistor 46 is not capable of holding off the maximum voltage on capacitor 42, a voltage divider circuit can be employed as is illustrated in FIG. 2, thereby distributing evenly the state of charge voltage across two transistors instead of one.

The subcircuit of FIG. 2 is connected to points 48, 54 and 56, in FIG. 1, and employs many of the same components. However, in addition, transistor 60 is connected between resistor 52 and the collector side of the Darlington connection. The base of transistor 60 is connected between voltage dividing resistances 62 and 64 which divide the voltage between buses 14 and 22. These resistances are preferably both 10 kΩ. Thus, transistor 60 is biased to take half the voltage drop when transistor 46 is shut off.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A welding power supply, said welding power supply comprising:
   charging means for controllably charging a welding energy storage capacitor;
   a welding energy storage capacitor connected to be charged by said charging means, a welding control switch and a welding transformer primary serially connected in parallel to said welding energy storage capacitor, a welding transformer secondary inductively coupled to said welding transformer primary and means for connecting electrodes to said welding transformer secondary, the improvement comprising:
   a capacitor bleed circuit connected in parallel to said welding energy storage capacitor between said welding control switch and said charging means for discharging at least part of the charge on said welding energy storage capacitor;
   detector means connected to said charging means for detecting capacitor charging current flowing to said welding energy storage capacitor, said detector means being connected to said capacitor bleed circuit to control said capacitor bleed circuit so that said capacitor bleed circuit bleeds at least some of the charge from said welding energy storage capacitor when said detector means detects cessation of charging current flowing to said welding energy storage capacitor.

2. The welding power supply of claim 1 wherein said detector means comprises a parallel connected network of a diode and a capacitor, said network being serially connected between said welding energy storage capacitor and said charging means.

3. The welding power supply of claim 2 wherein said capacitor bleed circuit comprises a serially connected resistor and transistor, with said transistor connected to said detector means so that it is made conductive when said detector means indicates cessation of welding energy storage capacitor charging.

4. A welding power supply said welding power supply comprising:
   charging means for controllably charging a welding energy storage capacitor;
   a welding energy storage capacitor connected to be charged by said charging means, a welding control switch and a welding transformer primary serially connected in parallel to said welding energy storage capacitor, a welding transformer secondary inductively coupled to said welding transformer primary and means for connecting electrodes to said welding transformer secondary, the improvement comprising:
   a capacitor bleed circuit connected in parallel to said welding energy storage capacitor for discharging at least part of the charge on said welding energy storage capacitor, said capacitor bleed circuit comprising a serially connected resistor and transistor with said transistor being connected as part of a Darlington amplifier;
   detector means connected to said charging means for detecting capacitor charging current flowing to said welding energy storage capacitor with said transistor connected to said detector means so that said detector means is made conductive when said detector means indicates cessation of welding energy storage capacitor charging so that said capacitor bleed circuit bleeds at least some of the charge from said welding energy storage capacitor when said detector means detects cessation of charging current flowing to said welding energy storage capacitor.

5. A welding power supply, said welding power supply comprising:
   charging means for controllably charging a welding energy storage capacitor;
   a welding energy storage capacitor connected to be charged by said charging means, a welding control switch and a welding transformer primary serially connected in parallel to said welding energy storage capacitor, a welding transformer secondary inductively coupled to said welding transformer primary and means for connecting electrodes to said welding transformer secondary, the improvement comprising:
   a capacitor bleed circuit comprising a serially connected resistor and transistor connected in parallel to said welding energy storage capacitor for discharging at least part of the charge on said welding energy storage capacitor;
   detector means connected to said charging means for detecting capacitor charging current flowing to said welding energy storage capacitor, said transistor being connected to said detector means so that said capacitor bleed circuit is made conductive when said detector means indicates cessation of welding energy storage capacitor charging for bleeding at least some of the charge from said welding energy storage capacitor when said detector means detects cessation of charging current.

6. The welding power supply of claim 5 wherein said capacitor discharge circuit transistor is connected as a Darlington amplifier.

7. A welding power supply, said welding power supply comprising:
   a source of alternating current, an unregulated bus and a second bus, rectifier means connected between said source of alternating current and said unregulated bus and said second bus, a regulated bus, regulating means connected between said unregulated bus and said regulated bus;
   a welding energy storage capacitor connected between said regulated bus and said second bus, a weld control switch and a welding transformer primary serially connected in parallel to said welding energy storage capacitor, a welding transformer secondary inductively coupled to said welding transformer primary and means for energizing electrodes connected to said welding transformer secondary, the improvement comprising:

a capacitor bleed circuit connected between said regulated bus and said second bus in parallel to said welding energy storage capacitor, said bleed circuit comprising:

detector means connected in one of said buses, said detector means detecting capacitor charging current flowing to said welding energy storage capacitor;

a capacitor discharge circuit connected in parallel to said welding energy storage capacitor;

said capacitor charging detecting means being connected to said capacitor discharge circuit to turn on said capacitor discharge circuit when said capacitor charging detecting means detects cessation of charging of said welding energy storage capacitor so that at least a part of the charge on said welding energy storage capacitor is conducted through said capacitor discharge circuit upon cessation of charging of said welding energy storage capacitor.

8. A welding power supply, said welding power supply comprising:

charging means and a welding energy storage capacitor connected together for controllable charging of said welding energy storage capacitor;

a welding control switch and a welding transformer primary serially connected in parallel to said welding energy storage capacitor;

a welding transformer secondary inductively coupled to said welding transformer primary and means for connecting electrodes to said welding transformer secondary, the improvement comprising:

capacitor charging detecting means connected between said capacitor charging means and said welding energy storage capacitor for detecting capacitor charging current, said charging detecting means comprising a resistive diode and a detector capacitor connected in parallel to said diode so that said detector capacitor is charged in one polarity during charging of said welding energy storage capacitor by said charging means and is differently charged during noncharging of said welding energy storage capacitor;

a capacitor discharge circuit, said capacitor discharge circuit being connected in parallel to said welding energy storage capacitor, said capacitor charging detecting means being connected to said capacitor discharge circuit to turn on said capacitor discharge circuit when said capacitor charging detecting means detects cessation of charging of said welding energy storage capacitor so that at least a part of the charge on said welding energy storage capacitor is conducted through said capacitor discharge circuit upon cessation of charging of said welding energy storage capacitor.

9. The welding power supply of claim 8 wherein a switching device is in said capacitor discharge circuit and said switching device comprises a pair of Darlington connected transistors connected across said charging detecting diode, and further including a bleed control resistor connected in said capacitor discharge circuit to control current flow therein.

* * * * *